Inventors:
Heinz E. Voigt & Wolfgang Händler
By [signature]
Patent Agent

Inventors:
Heinz E. Voigt & Wolfgang Händler
By [signature]
Patent Agent

United States Patent Office 3,098,219

Patented July 16, 1963

3,098,219

MONITORING ARRANGEMENT FOR PROGRAM-CONTROLLED ELECTRONIC COMPUTERS OR SIMILAR SYSTEMS

Heinz E. Voigt and Wolfgang Händler, Backnang, Germany, assignors to Telefunken G.m.b.H., Berlin, Germany Filed Jan. 27, 1958, Ser. No. 711,346
Claims priority, application Germany Feb. 23, 1957
1 Claim. (Cl. 340—213)

Figure 1:
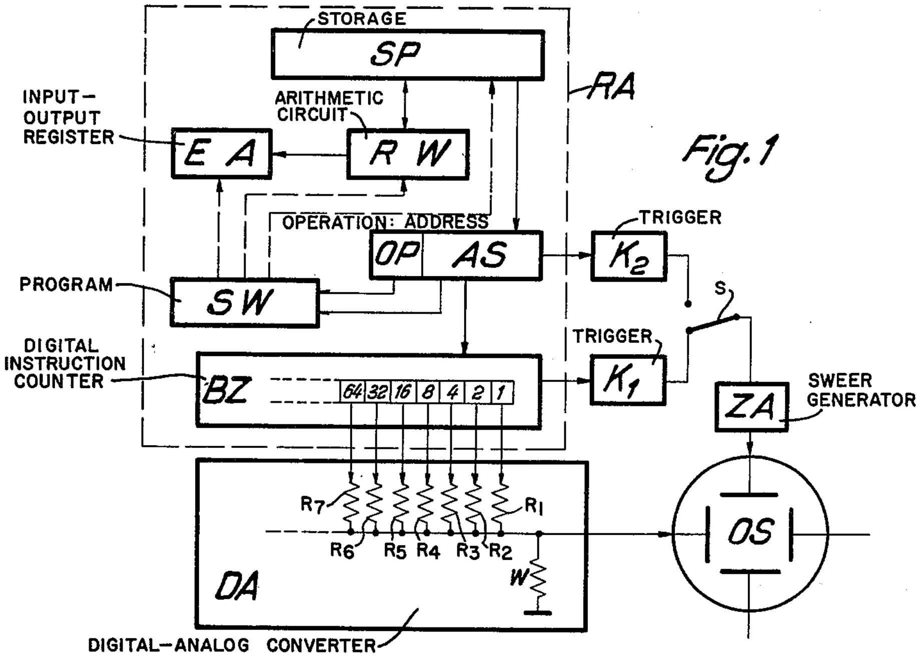

For program-controlled computers two types of monitoring arrangements are known: numerical checking incorporated in the program and operating monitors incorporated in the computer itself.

To the first type of monitoring that the prorgammer can introduce into the program there belong for example cross sum checks, double solving of operations with subsequent checking on coincidence of both results, back calculation of certain operations and comparison with the initial values, wherein for example a multiplication follows a division, or vice versa. If the cross sum check does not coincide with the computer calculation or if a difference is set up when double-solving or back-calculating is made, the computer is stopped automatically so that the mistake existing either in the program or in the computer can be detected. This type of checking involves a work increase in programming and supposes that the programmer has a greater mathematical knowledge. Furthermore calculation duration and store occupation must be substantially increased. Therefore in practice such checkings are confined only to a few program points.

Operation monitors incorporated in the computer itself comprise additional circuits which should increase safety of operation. It is known e.g. to provide a redundancy of the number code and instruction code, which will be used by the computer in view of checking whether a right information has been read. For this purpose the so-called 2-out-of-5 code is suitable, wherein each number from 0 to 9 is formed by two bits of five while the other three are missing. If more or less than two bits appear in such a five-bit combination, there must be an error and the computer is stopped automatically. Also cross sum checks or two parallel calculating systems performing the same operation can be incorporated in the computer. If differences occur the computer repeats the last operation until coincidence is achieved or stops when such coincidence is not to be obtained. The extra need of circuits for a satisfactory checking process amounts to 30%, which is considerable.

According to the invention which may apply both to actual program-controlled computers and to other program-controlled equipments such as control systems for automatic production, there is provided visual monitoring of the program allowing for easy determination of the kind and place of an error. The monitoring arrangement for program-controlled electronic computers or other program-controlled equipments according to the invention comprises means for deriving an analog voltage from the instant indication of the instruction counter and/or contents of an address register and also means using said analog voltage for providing a visual representation of the variation in time of the instruction counter indication and/or the instant contents of said address register. Means for visible representation of the variation in time may comprise for example a cathode-ray oscilloscope or a recorder. Thereby it is possible to obtain a picture which is substantially analogous to the flow diagram. The instruction counter e.g. of a program-controlled computer indicates which step of the program is being performed by the arithmetic unit at the instant considered. Once the instruction has been executed, in most cases the instruction which comes next in store is transferred to the instruction register while at the same time the instruction counter indication is increased by 1. In case of a program loop the program jumps back to an instruction placed at a preceding storage location and the instruction counter indication is reduced by a corresponding number of steps. Moreover the instruction counter indication can also be caused to jump when dealing with some types of routines, such as sub-routines, recorded at another storage location. Once the operations thus recorded have been performed, the instruction counter is caused to jump back to its former indication and then to go on counting according to the master routine. Thus the course of the instruction counter indication, which is partly continuous, partly jerky, gives a graphic representation of the program, as indicated hereafter by means of a few examples illustrated in the drawings.

Figure 7:
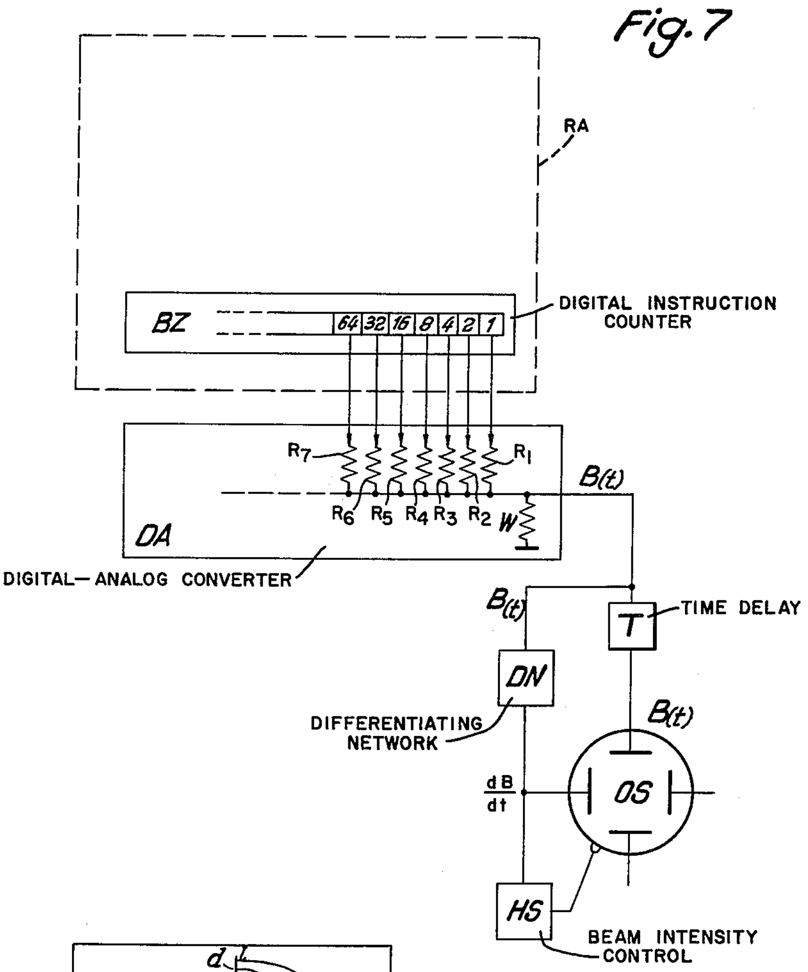
Figure 8:
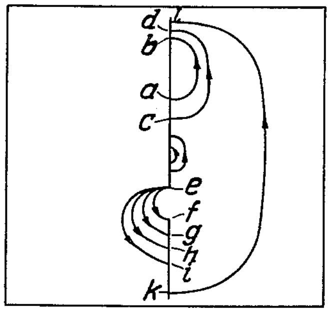

In the drawings FIG. 1 shows schematically one embodiment of the invention as used in connection with a one-address program-controlled digital computer; FIGS. 2 to 6 show patterns obtained on the screen of a cathode-ray oscilloscope for different types of routines executed by the computer of FIG. 1; FIG. 7 shows another form of embodiment of the invention and FIG. 8 is the pattern obtained on the oscilloscope screen with the latter embodiment.

FIG. 1 shows the simplified block diagram of a stored program one-address computer RA. Numbers and orders are led through the input and output devices EA to the store SP, e.g. a magnetic drum store. As actual calculation starts, instruction after instruction are called through the control system SW into the instruction register consisting of the operation register OP and the address register AS. Succession of calls is controlled by the instruction counter BZ. Generally after an instruction has been performed the instruction counter indication is increased by "one." However on conditional or unconditional jumps the address is changed and counting of the instruction counter goes on from the new address. At each step the control unit SW receives its instructions from the instruction register (AS/OP) and then guides the operation until the instruction is completely executed. At the end of the operation the instruction counter BZ receives the instruction "continue," i.e. increase the address by 1 or jump to another address.

When applying the invention to the automatic computer described, by way of example, the instruction counter BZ is connected to a digital-to-analog converter DA in which there is produced an electrical voltage proportional to the indication of the insturction counter, and fed for example to the horizontal deflecting plates of an oscilloscope tube OS. As shown, such a digital-to-analog converter may comprise a matrix of resistors $R_1$, $R_2$, $R_3$, $R_4$, $R_5$, $R_6$ and $R_7$, wherein currents are generated by the individual binary positions of the instruction counter, possibly via tubes not shown, when the binary position considered shows a "one," said currents being proportional to the position value 1, 2, 4, 8, 16 . . . of the respective binary positions. The sum current which is an analogous measure of the indication of the instruction counter at any moment flows then through the common leakage resistor W of the matrix. Thus, to the instruction counter indication there corresponds a predetermined proportional voltage across the resistor W, which voltage is used for horizontal deflection of the oscilloscope OS. A time-proportional deflecting voltage from a sweep generator ZA is applied to the vertical deflecting plates. Said voltage can be set back to a given value to reset the cathode ray beam to the initial deflection point, for example to the upper edge of the oscilloscope screen, either manually or by means of additional coincidence triggers K1 or K2.

The instant when a coincidence trigger responds can be associated to a predetermined instruction counter indication by selecting the trigger K1 by means of the switch 5, or to a predetermined operation type by selecting trigger K2 so that the analogous representation of the instruction counter indication starts at the instant when the associated counter indication or operation type has just been obtained in the corresponding register BZ or OP.

Figure 2:
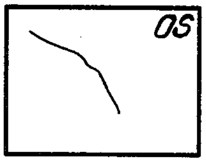

FIGS. 2 to 6 show a few typical program patterns such as they appear on the oscilloscope screen when using the invention. It will be assumed that the cathode-ray beam is deflected from top to bottom by the sweep generator ZA. In the case of a simple, straightforward program wherein the instruction counter indication is increased by 1 after each step, the beam will follow a diagonal path from top left to bottom right, as illustrated in FIG. 2. According to the speed with which the individual operations are carried out the plotted line will be more or less steep. The first part of the curve represented in FIG. 2 shows a substantially rapid performance, such as when additions are being performed, and the second part shows a substantially slower performance, such as with multiplications. The slope with which the straight portions of the program are displayed on the screen is an indication of the operation speed and allows already for some conclusions on the succession of operations.

Figure 3:
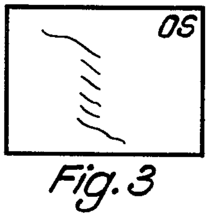

FIG. 3 illustrates a portion of the program including a loop, wherein an instruction series in the store is called up several times, as is the case when carrying out reiterations. After reaching a predetermined indication the instruction counter jumps back to an earlier one and shows by repeating the same process that the operations between both instruction counter indications are carried out a plurality of times successively (6 times in the example illustrated).

Figure 4:
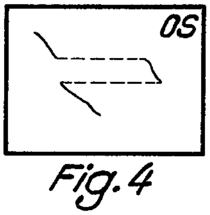

FIG. 4 shows insertion of a sub-routine into the main program. A sub-routine is generally stored in another region of the store, which is characterised by corresponding instruction counter indications. Therefore, in such a case, the cathode-ray beam jumps horizontally to another position displays the sub-routine there and jumps back to the prior indication from which it goes on displaying the main program. The sub-routine may also have loops in the way described already with reference to FIG. 3.

Figure 5:
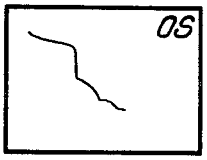

FIG. 5 shows the pattern formed when an instruction is held in the instruction register to be carried out repeatedly under control of another register (not shown in FIG. 1). A vertical line then appears on the cathode-ray tube screen, since the instruction counter indication is constant while the time base deflection goes on.

The aforementioned examples show only a few typical forms of the representation in time of the instruction counter indication. In a normal program all these forms appear at predetermined positions and combination of the various program portions is thus displayed as a corresponding pattern on the oscilloscope screen. By reference to the storage sequence, the user of the computer can follow the calculation process on the screen of the cathode-ray-tube and easily detect deviations on account of variations in the pattern.

For the sake of a more accurate analysis of individual portions of the program it is advantageous to make adjustable the rate both of the sweep (for example, vertical) deflection and the (for example, horizontal) deflection proportional to the instruction counter indication.

To obtain a good survey of the program it may be advantageous to employ oscilloscope tubes having a long persistency or a blue-writing oscillograph where the whole pattern is cancelled only after a complete sweep. When using a blue-writng oscillograph it is possible to leave a first displayed pattern on the screen and display a second pattern so as to draw conclusions from the difference between both patterns. In such examinations departures from the program, for example, appears more clearly.

Figure 6:
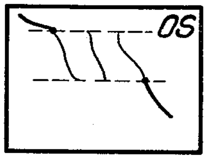

By way of example, FIG. 6 shows a pattern for which the oscillograph is synchronised on a predetermined instruction counter indication within a loop. After repeated sweeps of the loop the oscillograph displays the different branches of a branched program (a three-branch display being shown in the drawing); the individual branches are represented by thinner lines than the main program, because they are not swept so often. By means of such patterns it can therefore be decided whether at the program points where the computer must decide on which branch program it will work on, such a decision will effectively be made and how decisions will be distributed according to the various possibilities.

The so-called drum-controlled computers have features requiring an additional remark. The whole operation period in such computers is composed of the specific operation time of the arithmetic unit itself and the access time for the storage location. The access time for the storage location however is not a constant. It is rather random and lasts a whole drum revolution in the maximum case, yet only a half-revolution on the average. This leads to the fact that the picture displayed by oscilloscopes or recorders depends on some random events whereas the aim was to obtain the topological pattern of the program alone. Since in drum-controlled computers the arithmetic unit remains at a standstill during the access time it is easy to derive a signal at the beginning of the access time and a second signal at the end thereof from the control arrangements associated. In the course of the access time said two signals are used to cut off the time base deflection of the oscilloscope or the recorder and to connect it again at the beginning of the actual operation, so that also for such a computer the desired pattern is obtained.

In order to characterise particularly decisive program points it is possible, for example on carrying out predetermined organizational instructions, to derive an additional signal from the computer, said signal causing the electron beam to draw a special mark, such as a small circle, which outlines the interesting program point in the pattern. Thus a pulse typical for the operation to be characterised is derived from the computer and is used to unlock a gate circuit through which suitable additional voltages are fed to both pairs of deflecting plates of the oscilloscope and cause a small circle to be drawn at the corresponding point of the screen.

After a little practice the programmer can foretell the oscillogram to be expected for a new program. Thereby it is possible to use a monitoring device according to the invention as an auxiliary device for testing a new program. If said program should exhibit a failure the programmer can stop the calculation and look quietly for the mistake by means of the oscillogram, while the computer can already be used again by other users.

Also, when examining a new program step-by-step while triggering operations one after the other from the monitoring desk, a monitoring device according to the invention proves very suitable. The oscilloscope beam is then moved from point to point on the screen and it is thus possible to check whether the instruction counter indication is varried correctly according to the program provided.

For the last-mentioned purpose and also when carrying out routine programs, such as weather forecast calculations wherein nowadays unskilled operators are involved, the visual electron beam indicator can be replaced advantageously by recorders. In this case the orderly performance of the computer can be examined by means of an overlay pattern or comparison oscillograms recorded beforehand.

A further development of the inventive principle disclosed above lies in the fact that beside the instruction counter indication the contents of an address register can also be represented in analogous form on the screen of the oscilloscope or through the recorder. Only in particular cases indeed succession of storage locations indicated by the address will have so regular a structure that a visible record shows some interest, but in some cases a typical pattern of the program process can be generated. In particular, this is the case when storage of numbers and parameters is done according to a special scheme, such as in matrix calculation, exponential series developments, interpolations and the like. The picture patterns appearing with such types of operations give indications on the program in the same way as the patterns illustrated in FIGS. 2 to 6. According to a further aspect of the invention the sequence of an address register can therefore be represented as a function of time in the same manner as indicated for the instruction counter indication. The technical process is identical to that described above for the instruction counter indication, so that there is no need of repeating it. Representation can be obtained by means of a second oscillograph beam or in known manner by means of a single-beam oscillograph by changing over between the two digital-to-analog converters associated.

There will be described hereafter a further form of a monitoring arrangement according to the invention, wherein for visual program monitoring the variation in time B(*t*) of the instruction counter indication itself is represented in one coordinate of a Cartesian coordinate system and the derivative in time of said variation $dB/dt$ is represented in the other coordinate. Preferably the representation means also comprises a cathode-ray oscillograph having a voltage (or a current) proportional to the instruction counter indication fed directly to one deflecting direction and the same voltage (or the same current) fed to the other deflecting direction through a differentiating network.

FIG. 7 shows such a monitoring arrangment as applied to a computer RA, such as illustrated in FIG. 1. The actual computer thus comprises substantially the same elements, i.e. a store SP, an arithmetic unit RW, an input and output circuit EA, an instruction register consisting of an operation register OP and an address register AS, a control unit SW and finally the instruction counter BZ, the latter only being produced in FIG. 7.

As in the form of embodiment described with reference to FIG. 1, an analog voltage substantially proportional to the instruction counter indication is derived from a a digital-to-analog converter DA. Said voltage is fed, for example, to the vertical deflecting plates of the oscillograph OS directly, so that the vertical deflection on the oscillograph screen is a measure of the instruction counter indication at any instant. Furthermore, said analog voltage B(*t*) is fed to a differentiating network DN, wherein the variation velocity of the analog voltage B, that is, the derivative in time $dB/dt$ is also generated as an analog voltage. This last-mentioned voltage is applied to the horizontal deflecting plates of the oscillograph OS.

In straight portions of the program the analog voltage $dB/dt$ proportional to the variation velocity is negligible and can be wholly suppressed by means of a suitable bias in the network DN. However as soon as jumps occur in the program the voltage $dB/dt$ will substantially differ from zero and become proportionally as great as the difference between both indications of the instruction counter between which the jump has occurred. Voltage polarity is so selected that on the occurrence of a jump toward a smaller instruction counter indication, for instance in a program loop, i.e. when the differential quotient is negative, there is produced a shift toward the right-hand side of the oscillograph screen, whereas on the occurrence of jumps toward a greater instruction counter indication, i.e. with a positive differential quotient, a shift appears on the left-hand side of the oscillograph screen.

There then results on the screen of the oscillograph a pattern such as shown in FIG. 8 by way of example for any given program. In the case of usual elementary operations for which the instruction counter indication is increased by 1 after each operation the beam travels approximately on the centre line of the picture area from top to bottom. The analog value $dB/dt$ is substantially zero and may also be completely eliminated, as aforementioned. In case of a back jump, for example from point *a* to point *b* the analog value for $dB/dt$ is suddenly altered to a negative value which corresponds to the span of the jump, in other words, to the interval *a*–*b*, and deflects the beam to the right correspondingly. Therefore a loop is described from point *a* back to point *b* through the right-hand half portion of the screen. If the jump is greater, such as from point *c* to point *d*, deflection is greater correspondingly. When the instruction counter indication jumps forward, for example when a sub-routine is called in or branching of the main program occurs the beam is shifted to the left correspondingly, as shown for example between the point *e* on the one hand, and points *f*, *g*, *h*, or *i* on the other hand. When a program cycle is over, the instruction counter jumps back from point *k* to point *l*, as illustrated in the drawing. Since this jump has the greatest span it causes the greatest lateral shift. Altogether there appears on the oscillograph screen, in particular when a long persisting or a blue-writing screen is used, a distinct pattern which is still more similar to the usual representation of a flow diagram than the pictures of FIGS. 2–6 obtained by means of the arrangement according to FIG. 1.

Since plotting on the screen becomes weaker when jumps are greater, that is, when the electron beam is moved over the screen more rapidly, it is advantageous to employ the voltage derived from the differentiating network DN simultaneously to increase the beam brightness in accordance with the variation velocity. For this purpose the voltage $dB/dt$ is fed to a device HS for cathode-ray beam brightness control in such a manner that the beam becomes brighter for greater values of the differentiated voltage. Such circuits are well-known in the art and need no further description. Moreover in order to obtain a more accurate representation it may be necessary to take into account the time delay of the signal in the differentiating network DN. For this purpose a time delay circuit, such as T, can be connected into the line of the signal B(*t*) leading to the vertical deflecting plates—said member having the same time delay as the differentiating network DN.

Monitoring arrangements according to the invention are also advantageously used as combined with the conventional monitoring types mentioned at the beginning of the specification. While the main purpose of the conventional methods aforementioned is to check whether arithmetic operations are carried out correctly, the monitoring arrangement according to the invention allows for a check of the correct succession of operations. Consequently both conventional and novel means complement each other advantageously.

We claim:

In a program-controlled electronic computer having storage means containing coded data information, monitoring apparatus comprising converter means converting said data information to analog voltages representing the instantaneous information in said storage means; said monitoring apparatus including oscilloscope means; oscilloscope sweep means for delivering a deflection voltage, said sweep means being connected to the output of said converter means to deliver said deflection voltage with the reading out of said stored information; said oscilloscope means being connected to be deflected in one direction by said analog voltage and in the other direction by said sweep voltage, said sweep means comprising a differentiating network connected with said analog voltage and delivering a sweep voltage proportional to the rate of change of said analog voltage, said oscilloscope means comprising a cathode ray oscilloscope having an intensity control electrode and having coordinate deflection means connected respectively with said analog voltage and the differentiated deflection voltage, and cathode ray intensity control means connected with the output of said differentiating network and with said electrode and brightening the intensity of the cathode ray beam in proportion to the instantaneous magnitudes of the differentiated deflection voltage.

References Cited in the file of this patent

UNITED STATES PATENTS

| | | |
|---|---|---|
| 2,146,862 | Shumard | Feb. 14, 1939 |
| 2,455,373 | Lester | Dec. 7, 1948 |
| 2,646,555 | Straehl | July 21, 1953 |
| 2,708,751 | Shepherd | May 17, 1955 |
| 2,830,285 | Davis et al. | Apr. 8, 1958 |
| 2,858,475 | Blake | Oct. 28, 1958 |
| 2,920,312 | Gordon et al. | Jan. 5, 1960 |
| 2,942,251 | Shanahan | June 21, 1960 |